United States Patent [19]

Long

[11] 3,828,312

[45] Aug. 6, 1974

[54] DIGITAL DATA CHANGE DETECTOR

[75] Inventor: Robert Gordon Long, Scarborough, Ontario, Canada

[73] Assignee: D.D.I. Communications, Inc., Lewiston, N.Y.

[22] Filed: Feb. 20, 1973

[21] Appl. No.: 333,443

[52] U.S. Cl. ........................ 340/146.1 R, 235/153 A

[51] Int. Cl. ............................................ G06f 11/00

[58] Field of Search .. 340/146.1 C, 146.1 R, 152 T, 340/167 A, 203; 179/15 R; 235/153 A; 307/234, 216

[56] References Cited

UNITED STATES PATENTS

| | | | |
|---|---|---|---|
| 3,237,188 | 2/1966 | Shair et al. | 307/216 |
| 3,299,271 | 1/1967 | Sitites | 307/234 |
| 3,413,412 | 11/1968 | Townsend | 307/234 |
| 3,454,788 | 7/1969 | Tyler et al. | 307/234 |
| 3,458,822 | 7/1969 | Hahn, Jr. | 307/234 |
| 3,462,736 | 8/1969 | Hollands | 340/146.1 C |
| 3,500,369 | 3/1970 | Kellam, Jr. | 307/234 |
| 3,652,943 | 3/1972 | Piccirilli | 307/234 |
| 3,723,658 | 3/1973 | Huebner et al. | 179/15 R |
| 3,727,142 | 4/1973 | De Sipio et al. | 340/167 A |

OTHER PUBLICATIONS

Rogers & Haley, Exclusive-OR Single-Shot, IBM Technical Disclosure Bulletin, Vol. 12, No. 1, June 1969.

*Primary Examiner*—Charles E. Atkinson

*Attorney, Agent, or Firm*—Woodling, Krost, Granger & Rust

[57] ABSTRACT

A change detector is disclosed for use on digital data. Incoming data bits are either high or low and are applied to input terminals. From one input terminal the change is applied to a first input of an exclusive OR or NOR gate and this change is applied through a time delay circuit to a second input on that same gate. As a result, the exclusive alternative gate develops an output pulse in accordance with the time delay. A plurality of such input terminals and gates are utilized with the outputs of the gates all connected in parallel and developing an output pulse upon a change in any one of the incoming data signals to the input terminals. The foregoing abstract is merely a resume of one general application, is not a complete discussion of all principles of operation or applications, and is not to be construed as a limitation on the scope of the claimed subject matter.

10 Claims, 2 Drawing Figures

Fig. I

DIGITAL DATA CHANGE DETECTOR

BACKGROUND OF THE INVENTION

Digital data systems have been used to monitor a machine or a group of machines or a process, for example, to monitor the open or closed condition of a switch or the running or stopped condition of a motor, for example. This digital data is in effect a group of paralleled switches which are either open or closed and may be used to control a group of pilot lights, for example, so that a supervisor may tell at a glance the condition of the machine or process. Such digital data may be sent over a long telephone line by an extendable multiplexer such as in the copending application, Ser. No. 158,362 filed June 30, 1971 now U.S. Pat. No. 3,723,658, issued Mar. 27, 1973. By such means, the supervisory panel may be at a distance from many separately located machines or processes under surveillance.

Another use for the digital data system is not only to display this machine or process status information to a supervisor but also to supply it to a computer. Simple computers may be connected directly to receive such data with the data being up-dated constantly as the changes in the machine or process occur. With more expensive, larger and complex computers, the cost of the computer time, whether owned or leased, increases considerably. In such cases it is usually uneconomical to have the data continuously being supplied to the computer so that the computer may use this data input to control the machine or process.

Time sharing computers are available wherein the computer might share its time among a large number of input terminals devoting a fraction of a second to working on the problems of each data input terminal in sequence. However, in such case the data cannot be supplied continuously to the computer, otherwise the computer might miss some of the data input being supplied.

Accordingly, an object of the invention is to provide a digital data change detector which detects a change on any of the incoming data so that it may be passed to a computer terminal.

Another object of the invention is to provide a change detector which detects the change in any incoming data bit and presents it as a change in a data word, with the word being a given plurality of bits.

Another object of the invention is to provide a digital data change detector which is simple, reliable and economical to construct.

Another object of the invention is to provide a digital data change detector which provides an output pulse for any change in incoming data with this pulse giving a signal to a computer terminal that a change has occurred.

Another object of the invention is to provide a digital data change detector in conjunction with a scanning system so that the scan of plural data words is halted upon determining a change in any bit of any word.

SUMMARY OF THE INVENTION

The invention may be incorporated in a digital data change detector, comprising in combination, an exclusive alternative gate of the exclusive OR or NOR type, first and second inputs and an output on said exclusive alternative gate, first means establishing on said first input of said gate incoming digital data to be responsive to any change thereof, a time delay circuit, and second means connecting any change on said gate first input to said time delay circuit and to said second input of said gate to establish a time delayed application of a data change to said gate second input to develop a gate output pulse.

Other objects and a fuller understanding of the invention may be had by referring to the following description and claims, taken in conjunction with the accompanying drawing.

DESCRIPTION OF THE PREFERRED EMBODIMENT

Figure 1:
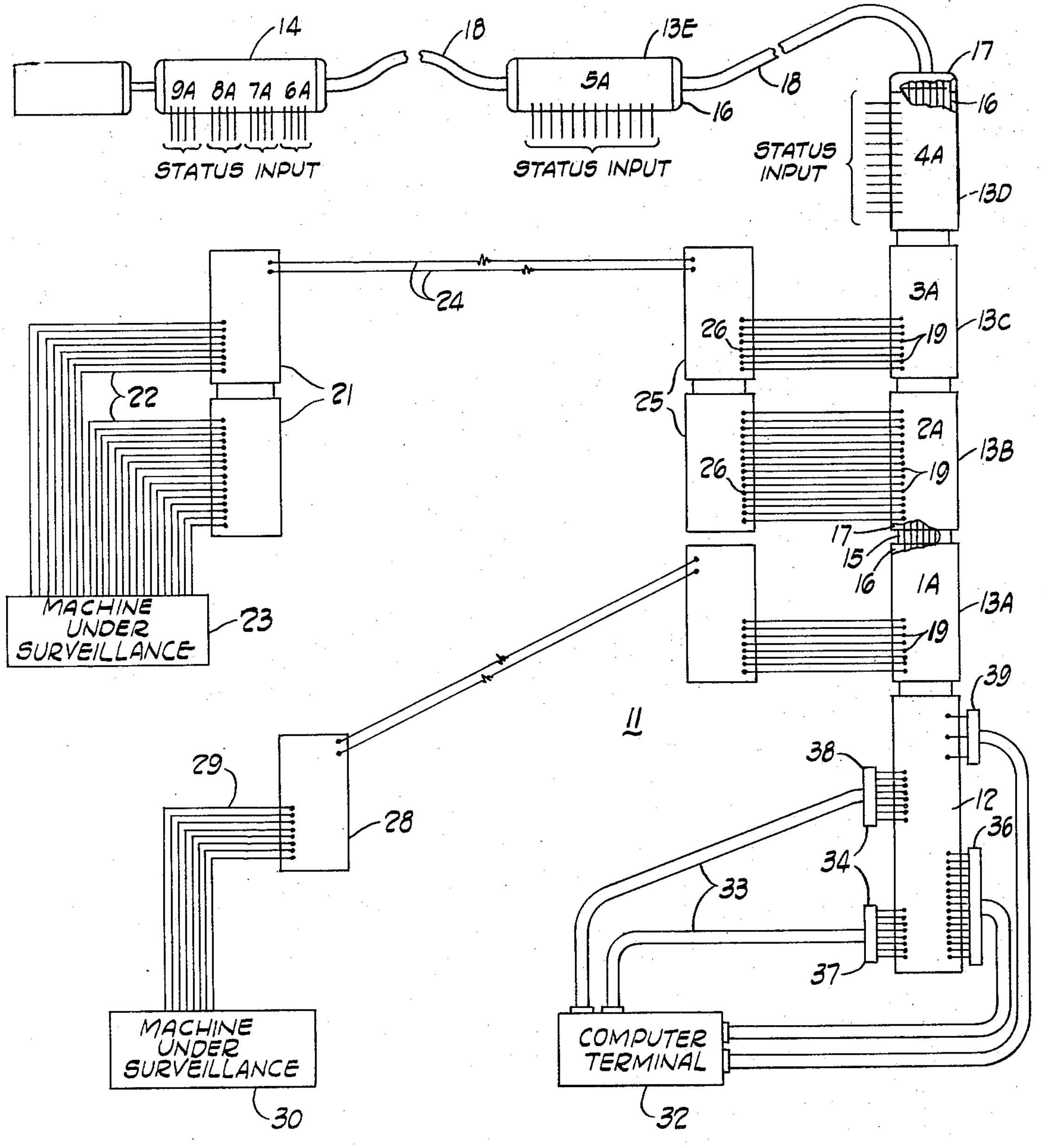
FIG. 1 is a schematic diagram of the entire digital data interface system.

FIG. 1 is a schematic diagram of a digital data computer interface system 11 which embodies the invention. This system 11 includes a transmitter assembly which has a computer interface transmitter 12 and a plurality of transmitter extenders 13 and 14. A first plurality of conductors 15 are paralleled to each of the transmitter extenders 13 and 14 and to the interface transmitter 12. A plug and socket means is used to interconnect the extenders and the transmitter and in the preferred embodiment a plug 16 is provided on one end of an extender and a socket 17 is provided on the other end of the extender. In such manner the extenders may be connected in sequence. Also a socket 17 may connect onto a plug 16 with this socket 17 connected to a flexible cable 18 and the other end of the cable 18 carrying a socket 16 for connection to a remotely mounted extender 13E or 14.

Digital data is established on the transmitter extenders 13 and 14 and the transmitter 12 by any suitable means. In the preferred embodiment this digital data is established as digitized words in a sentence. By definition, one or more words is established on each extender 13 or 14. Each word is made up of a plurality of data bits with these bits applied to input terminals 19. There may be two or more bits to a word, for example, there may be four bits to the word 6A on the input terminals 19 of extender 14. Also there may be eight bits to a word 1A or 3A on the input terminal 19 of extenders 13A and 13C. Alternatively there may be 16 bits to words 2A and 4A on input terminals 19 of extenders 13B and 13D.

This digitized data may be established on the transmitter assembly in any number of ways. The extendable multiplexer of the copending application, Ser. No. 158,362, filed June 30, 1971, now U.S. Pat No. 3,723,658, may be used to establish such digitized data. Such extendable multiplexer may include a digital transmitter assembly 21 connected by conductors 22 to a process or machine 23 under surveillance. The digital transmitter assembly 21 multiplexes such digital data and sends it over a pair of conductors 24 such as a telephone line to a digital receiver assembly 25 which decodes the multiplexed signal and supplies it from output terminals 26 via individual conductors to the input terminals 19 of the transmitter extenders 13. The computer interface system 11 is quite flexible and a part of the digital data may come from a separate digital transmitter assembly 28 having input terminals connected by conductors 29 to a process or machine 30 under surveillance. Status inputs of a similar type may be supplied to the extenders 13D and 13E. Where the status input is of words of a small number of bits, for example, four bits per word, then the extender 14 may be used wherein the input terminals are grouped into words of four bits each. The status input to these last mentioned extenders may be from any process or machine under surveillance such as machines 23 or 30.

The computer interface transmitter 12 may be connected directly to a computer or computer terminal 32 by means of flexible cables 33 and plug and socket connections 34. By this means data may be supplied to the computer and signals then may be received from the computer 32.

Figure 2:
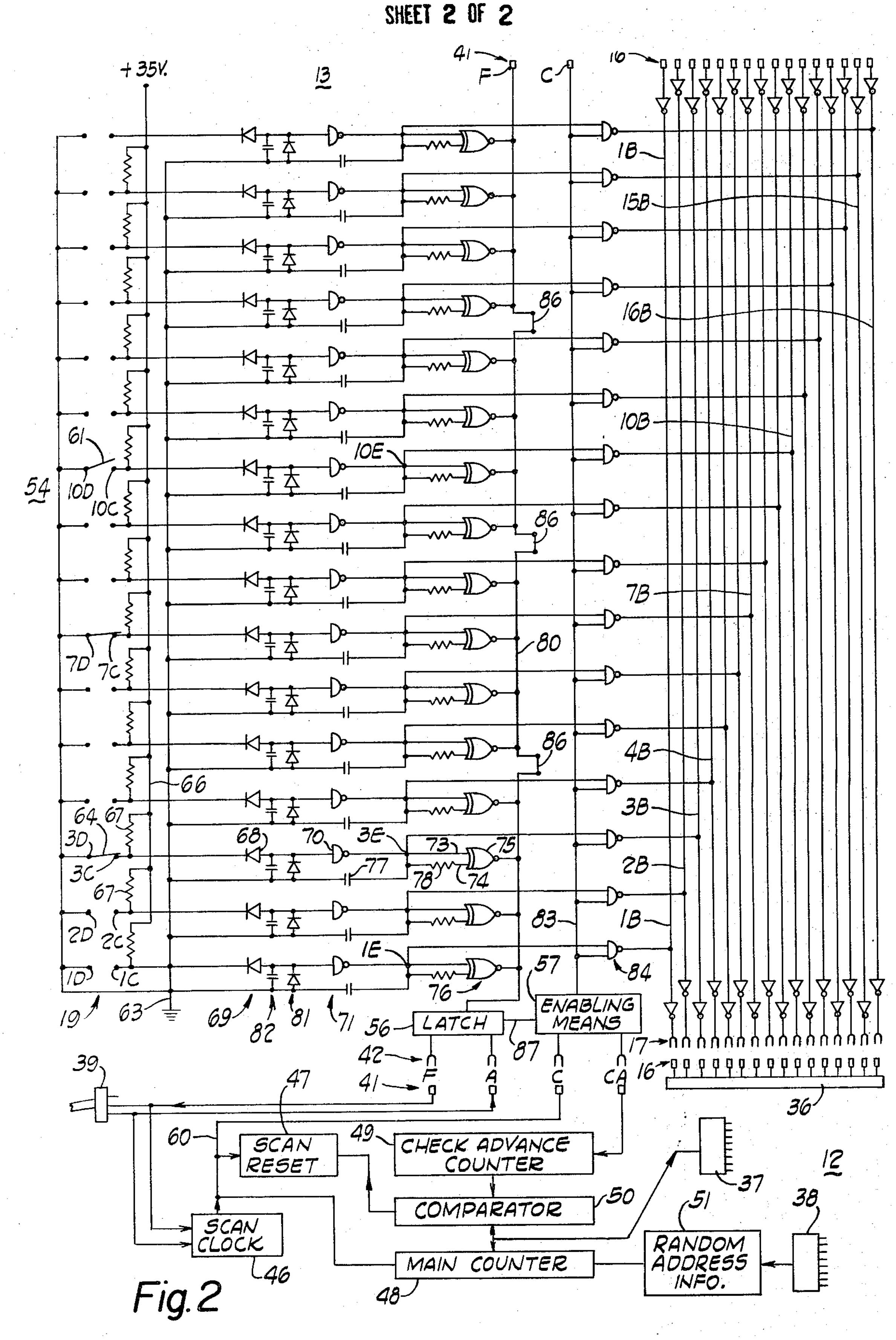
FIG. 2 is a schematic diagram of a digital data change detector as part of the interface system.

FIG. 2 illustrates schematically the circuit of the digital data change detector 54 which is a part of the computer interface system 11 and is generally within the interface transmitter 12 and one of the extenders 13. This FIG. 2 shows the plurality of conductors 15 and in this case there are 16 such conductors 1B through 16B in order to establish the status of a 16-bit word. This plurality of conductors 15 in the extender 13 has a multiple conductor plug 16 at the upper end of FIG. 2 and has a multiple conductor socket 17 at the lower end of this extender. The socket 17 will receive the multiple conductor plug 16 on the upper end of the computer interface transmitter 12 which is shown at the lower part of FIG. 2. This multiple conductor plug 16 connects to a word information socket 36 shown in FIGS. 1 and 2 which is connected to the computer terminal 32. The multiple conductor plug 16 at the top of extender 13 connects into a similar multiple conductor socket 17 on the bottom of the next extender so that these extenders may be connected in sequence as shown in FIG. 1. This interconnects the plurality of the conductors 15.

Individual conductors 1B through 16B make up the set of plurality of conductors 15 within each extender 13. Additional multiple conductor sockets 37, 38 and 39 are provided in the transmitter 12 for connection to the computer terminal 32. The socket 37 is for addressing information to the computer, the socket 38 is for random address inquiry from the computer and socket 39 is for control signals. A multiple conductor plug 41 on the transmitter 12 may connect with a multiple conductor socket 42 on the extender 13 for supplying control signals between these two units. Also the extender 13 has the same multiple conductor plug 41 at the opposite end thereof for connection with the next extender in sequence. These connections may be similar to that shown in the Extendable Multiplexer, Ser. No. 158,362, now U.S. Pat No. 3,723,658.

The interface transmitter 12 includes generally a scan clock 46, a scan reset 47, a main counter 48, a check advance counter 49, a comparator 50 and a random address input circuit 51. The transmitter extenders such as extender 13 include generally a change detector circuit 54 to which the input terminals 19 are connected, the plurality of conductors 15, a latch 56 and enabling means 57. The computer interface system 11 has the extenders 13 and 14 connected in series and they are extendable to a mathematical limit established as $2^{n-1}$, where $n$ is the number of digits in the main counter 48. One or more words is established on each extender 13 or 14, the series of extenders forming a plurality of words in a complete sentence. Each word 1A–9A is a plurality of bits of digital data. The interface transmitter 12 includes scanning means which is primarily the scan clock 46 or pulse generating means to provide a sequential scan of each of the words in the extenders 13 and 14. The words are scanned word by word rather than by bit by bit and this makes possible a much more rapid scanning of the complete digital data sentence. The scanning is effected sequentially through the extenders. The scan clock 46 emits a sequence of clock pulses on a clock line 60 which are applied to the main counter 48 for counting these pulses. They are also applied to the scan reset circuit 47 and to a clock contact C in the multiple conductor plug 41 whereat they are passed to the extender 13 and go to the enabling means 57. Each enabling means 57 within each extender 13 enables that particular extender upon receiving a particular clock pulse. This enabling establishes a scan of that particular extender and after it has been scanned, then a check advance pulse is developed by the enabling means 57 which is supplied to a socket CA which is a part of the multiple conductor socket 42. From here it is passed back to the transmitter 12 on the pin CA of the plug 41 and returns to the check advance counter 49. This counter 49 counts the number of check advance pulses and has an output to the comparator 50. The main counter 50 also has an output to the comparator 50 and so long as the two counters remain equal, then there is no reset. Suppose there are 67 words in the sentence, then enough extenders would be plugged together sequentially to achieve the 67 words. The first 67 pulses would go to the main counter to be counted, preferably with a natural binary output, and as each word was scanned, a check advance pulse would be returned to the check advance counter. After the last word had been scanned, then any subsequent pulses from the scan clock would not be matched by the return of an echo pulse or check advance pulse to the check advance counter. Accordingly, the two counters would get out of step and the comparator 50 would recognize this fact sending a signal to the scan reset circuit 47 to reset the entire circuit. Upon this happening, the scan would begin anew to again scan the sequence of words in the extenders 13 and 14.

The object of this sequential scanning of the words is to determine if any of the bits of the various words has changed. The change detector 54 is the circuit which determines if such a change in any of the bits of a particular word has been changed and the circuit of FIG. 2 shows one of these change detector circuits 54. If a change has occurred in any of the bits, then a signal is given to the latch circuit 56 which latches or freezes the scan at this point. This is accomplished by the latch emitting a signal on a freeze socket F, which is passed to a freeze pin F in the plug 41 and stops the scan clock 46 at that particular word at which a change has been detected. The latch or freeze signal also is passed to the control signal socket 39. From here, as shown in FIG. 1, it passes to the computer terminal 32.

The computer may be a large computer which works on many different problems, devoting a small amount of time to each one and then passing to the next. When the computer is ready to accept this particular data input, the presence of a signal on the freeze line F of the socket 39 will cause the computer to read the word status information which appears on the 16 lines 15 at socket 36. The computer also reads from socket 37 the address of this particular word, for example, it might be the 39th word out of the 67 in the sentence. After this, an acknowledge signal is supplied by the computer which restarts the scan clock 46 and resets the latch 56. This entire system is better described in the copending application entitled Digital Data Interface System, filed concurrently herewith.

If there is no change in the word since the last scan, then the scanning of the words in the sentence proceeds without interruption until the end of the sentence. At this time the circuit is reset by the reset circuit 47 and the scan begins anew.

CHANGE DETECTOR

Assume now that there is a change, at any time, on a particular word of the sentence. For example, let it be assumed that there is a change on the 33rd word; namely, the 33rd extender, and the input condition on the 10th input terminal 19 goes from a high to a low condition by closing of a switch 61 thereon. FIG. 2 shows a series of 16 of the input terminals 19 which may be referred to as terminals 1C through 16C. Companion terminals 1D through 16D are each connected to ground 63.

As an example, a closed switch 64 is shown connected across terminals 7D and 7C and an open switch 61 is shown connected across terminals 10D and 10C. This is merely for illustration and the open or closed switch will usually be in the machine under surveillance 23 or 30 of FIG. 1. A power line 66 is supplied with positive voltage, e.g., 35 volts. This feeds through a group of resistors 67 to make each of the terminals 1C–16C normally high. When the switch 64 is closed, as an example, this places a low condition on terminal 3C. A diode 68 of a group of 16 diodes 69 will conduct causing the input to an inverting gate 70 to go low. This gate 70 is one of a group of 16 NAND gates 71. Inverting gate 70 thus has an output at a terminal 3E and acts as a buffer amplifier, isolating the input signal at input terminal 19 from the individual output terminal 3E. The output of gate 70 goes from low to high, upon closing of switch 64. This change is applied to a first input 73 of a gate 75. A time delay circuit includes a time delay capacitor 77 connected between terminal 3E and ground 63 and in conjunction with a resistor 78 gives a very short time delay before application of this change, from low to high, to a second input 74 of gate 75. Gate 75 is an exclusive alternative gate of the exclusive OR or NOR type, and in this embodiment is an exclusive NOR gate. Accordingly, for a short time of the time delay, there is an unequal input on the two inputs of this gate to give a short negative-going pulse on the output conductor 80 upon any change on the input terminals 19. Also, if the switch 64 were to be opened this would make terminal 3C suddenly high, driving terminal 3E from high to low. This would put a low voltage on the first input 73 followed a short time later by a low voltage on the second input 74 of gate 75. For this short time delay there would be unequal inputs on the exclusive NOR gate 75 for a short negative going pulse on the output conductor 80. The above shows that whether the change is from low to high or high to low, the exclusive NOR gate 75 of the group of gates 76 will deliver a negative-going pulse on conductor 80.

The change detector 54 also includes a protective circuit protecting against voltage surges on the input terminals 19. This protective circuit includes the diode group 69, also diodes 81 and capacitors 82.

As an example, assume that there was a change in the 33rd word or extender by the closing of the switch 61 on the 10th input terminal 10C of the group of input terminals 19. This change may occur at any time.

As the 33rd extender is scanned by a clock pulse applied to the enabling means 57 therein, an enabling line 83 goes high to enable that particular 33rd extender. This enables an entire group of NAND gates 84. Accordingly, the change from high to low on terminal 10C means a change from low to high on terminal 10E and hence a change from high to low on the output of the respective NAND gate 84. This puts a low condition on conductor 10B, so that the word status is available to the computer.

Conductor 80 is shown as including three jumpers 86. If the center jumper is removed, this will break the change detector into two eight-bit words. If all jumpers are removed, this will break the change detector into four four-bit words. This is the circuit in extender 14, shown in FIG. 1. The remaining circuit of the extender shown in FIG. 2 is then quadrupled to permit it to have an enabling means 57 and to develop a freeze pulse by latch 56 for each word.

This change may occur any time and accordingly, the negative going pulse will occur on conductor 80 at any time to activate the latch 56. When that particular extender, the 33rd extender in the above example, is scanned, that particular enabling means 57 in that extender is enabled. This means that that particular changed bit will appear on the particular one of the conductors 1B through 16B at the same time that the enabling means 57 by means of a conductor 87 also actuates the latch 56 and it is at this time that a freeze pulse is developed on the freeze line F. Accordingly, this scan is stopped by this freeze pulse, awaiting the computer to determine the changed word and the address of such changed word. When the acknowledge signal arrives from the computer terminal 32, then this again starts the scan and the scan starts at the 34th extender, rather than at the first extender. The reset connections have not been shown but the entire circuit is reset once the end of the word sentence has been reached by the scanning means.

By the above circuit a change detector 54 is described which determines a change in a single bit and also determines a change in an entire word or any bit in such entire word. Any such change develops a signal on the output conductor 80 to actuate the latch 56 so that the scan will be stopped upon the scan of that particular word or extender.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A digital data change detector, comprising in combination, a plurality of alternative gates of the exclusive OR or NOR type, first and second inputs and an output on each of said exclusive alternative gates, means connecting said gate outputs in parallel, first means establishing on said first input of said gates incoming digital data to be responsive to any change thereof, a plurality of time delay circuits one each connected to each gate second input, and second means connecting any change on said first inputs of said gates to the respective time delay circuit and to the respective gate second input to establish a time delayed application of a data change to said gate second input to develop a gate output pulse on said paralleled outputs.

2. A digital data change detector as set forth in claim 1, wherein each said time delay circuit includes resistive and capacitive means.

3. A digital data change detector as set forth in claim 1, including a plurality of buffer amplifiers one each connected to each first input of said gates.

4. A digital data change detector as set forth in claim 1, wherein each said time delay circuit includes capacitive means connected between the respective gate first input and ground and includes resistive means connected between the respective gate first and second inputs.

5. A digital data change detector as set forth in claim 1, including a plurality of input terminals, means establishing on said input terminals incoming digital data, said first establishing means connecting each said input terminal to one of said gate first inputs, and a plurality of protective circuits one each connected between each said input terminal and the respective gate first input.

6. A digital data change detector as set forth in claim 5, wherein each said protective circuit includes a diode connected to conduct current toward the respective input terminal.

7. A digital data change detector as set forth in claim 6, wherein each said protective circuit includes a second diode connected to conduct current from ground toward the anode of the respective first mentioned diode.

8. A digital data change detector as set forth in claim 1, including a plurality of input terminals, means establishing on said input terminals incoming digital data, said first establishing means connecting each said input terminal to one of said gate first inputs, and a plurality of buffer amplifiers each connected as part of the respective first establishing means.

9. A digital data change detector as set forth in claim 8, wherein each said buffer amplifier is a NAND gate with a single input.

10. A digital data change detector as set forth in claim 8, including an output on each said buffer amplifier connected to the respective gate first input and connected to an individual output at which any change in said digital data is available.

* * * * *